(12) United States Patent
Marré et al.

(10) Patent No.: US 10,830,314 B2
(45) Date of Patent: Nov. 10, 2020

(54) METHOD FOR PRODUCING A MOTOR SHAFT OF A ROTOR OF AN ELECTRIC MOTOR

(71) Applicant: FELSS Systems GmbH, Koenigsbach-Stein (DE)

(72) Inventors: Michael Marré, Karlsruhe (DE); Arthur Fauth, Bretten (DE); Stefan Haller, Stuttgart (DE); Serjosha Heinrichs, Pforzheim (DE); Henning Wagner, Remchingen (DE)

(73) Assignee: FELSS Systems GmbH, Koenigsbach-Stein (DE)

( * ) Notice: Subject to any disclaimer, the term of this patent is extended or adjusted under 35 U.S.C. 154(b) by 36 days.

(21) Appl. No.: 15/792,901

(22) Filed: Oct. 25, 2017

(65) Prior Publication Data

US 2018/0112744 A1 Apr. 26, 2018

(30) Foreign Application Priority Data

Oct. 26, 2016 (EP) .................... 16195668

(51) Int. Cl.
*F16H 3/089* (2006.01)
*B21D 39/04* (2006.01)
(Continued)

(52) U.S. Cl.
CPC ............. *F16H 3/089* (2013.01); *B21D 39/04* (2013.01); *B21K 1/063* (2013.01); *F16C 3/035* (2013.01);
(Continued)

(58) Field of Classification Search
CPC ...... F16H 3/089; F16C 3/035; F16C 2380/26; B21K 1/063; H02K 7/003; H02K 7/006; B21D 39/04
See application file for complete search history.

(56) References Cited

U.S. PATENT DOCUMENTS

| | | | |
|---|---|---|---|
| 5,982,061 A | * 11/1999 | Grantz | H02K 5/1737 |
| | | | 310/67 R |
| 2004/0189126 A1 | * 9/2004 | Brunet | H02K 1/28 |
| | | | 310/90.5 |

(Continued)

FOREIGN PATENT DOCUMENTS

| | | |
|---|---|---|
| DE | 29603748 U1 | 9/1996 |
| DE | 203 07 198 U1 | 9/2003 |

(Continued)

OTHER PUBLICATIONS

FELSS Holding GMBH: "Cold forming: Rotary swaging and axial forming—Resource-efficient lightweight design for the masses", MAV Competence in machining production, Issue Jun. 2012, XP055349526, 3 pages.

(Continued)

*Primary Examiner* — Jermie E Cozart
(74) *Attorney, Agent, or Firm* — Collard & Roe, P.C.

(57) ABSTRACT

A motor shaft of an electric motor is produced by producing and interconnecting a first module and an additional module of the motor shaft. The first module of the motor shaft and/or the additional module of the motor shaft is or are provided with a module-end connection element by cold forming and/or by warm forming and/or by hot forming a base module. The first module of the motor shaft produced in this way and the additional module of the motor shaft produced in this way are then interconnected by joining the module-end connection elements on both ends. A motor shaft produced according to this method is formed of a correspondingly configured first module and a correspondingly configured additional module.

7 Claims, 2 Drawing Sheets

(51) Int. Cl.
*B21K 1/06* (2006.01)
*F16C 3/035* (2006.01)
*H02K 7/00* (2006.01)

(52) U.S. Cl.
CPC ............. *H02K 7/003* (2013.01); *H02K 7/006* (2013.01); *F16C 2380/26* (2013.01); *H02K 2213/12* (2013.01)

(56) References Cited

U.S. PATENT DOCUMENTS

| | | | | |
|---|---|---|---|---|
| 2004/0251769 | A1* | 12/2004 | Nguyen | H02K 7/003 310/261.1 |
| 2010/0061670 | A1 | 3/2010 | Yuan et al. | |
| 2016/0049845 | A1 | 2/2016 | Gove et al. | |

FOREIGN PATENT DOCUMENTS

| | | |
|---|---|---|
| DE | 10 2010 040 017 A1 | 3/2012 |
| WO | 03/032469 A2 | 4/2003 |

OTHER PUBLICATIONS

FELSS Holding GMBH: "Kaltumformung: Rundkneten and Axialformen—Ressourceneffizienter Leichtbau fuer die Masse", Mav Kompetenz in Der Spanenden Fertigung, Bd. Jun. 2012, Jun. 20, 2012 (Jun. 20, 2012), XP055349526, 3 pages.

European Search Report in EP 16195668.5 dated Apr. 3, 2017 with English translation of relevant parts.

Wang Guoshun, Guo Wei, Wuhan: Mechanical manufacturing foundation, University Press, Oct. 31, 2011, p. 118 (with English translation).

Chinese Office Action dated Oct. 28, 2019 in the corresponding Chinese application 201711014993.8 (with English translation).

Chinese Office Action/Search Report dated Aug. 4, 2020 issued in the corresponding Chinese Application Serial No. 201711014993.8 (with English Translation).

Li Yongmin: Machinery Manufacturing technology, Yellow River Water Conservancy, Oct. 31, 2008, p. 152 (with English translation).

D-Falk: "Metal Processing Technology" Human Resources & Social Security Press, Apr. 30, 1990, p. 85 (with English translation).

* cited by examiner

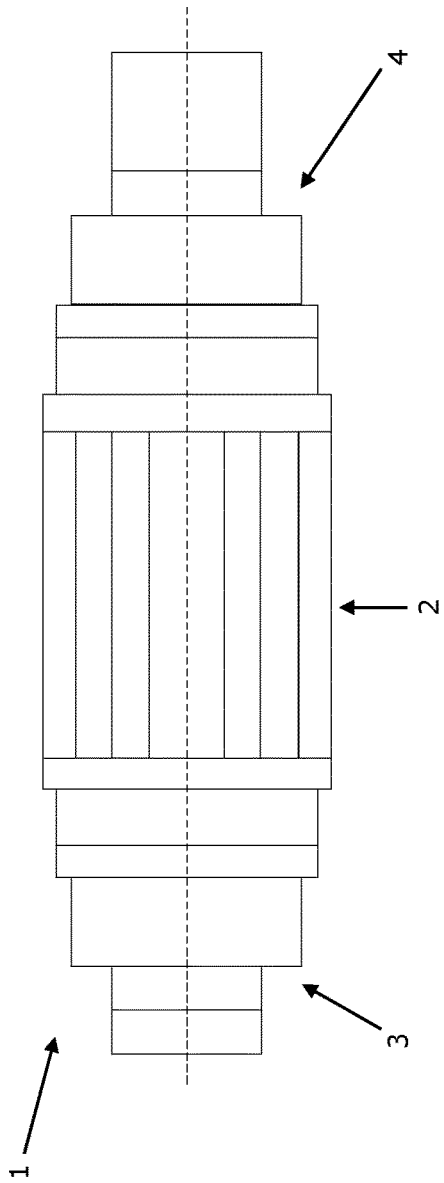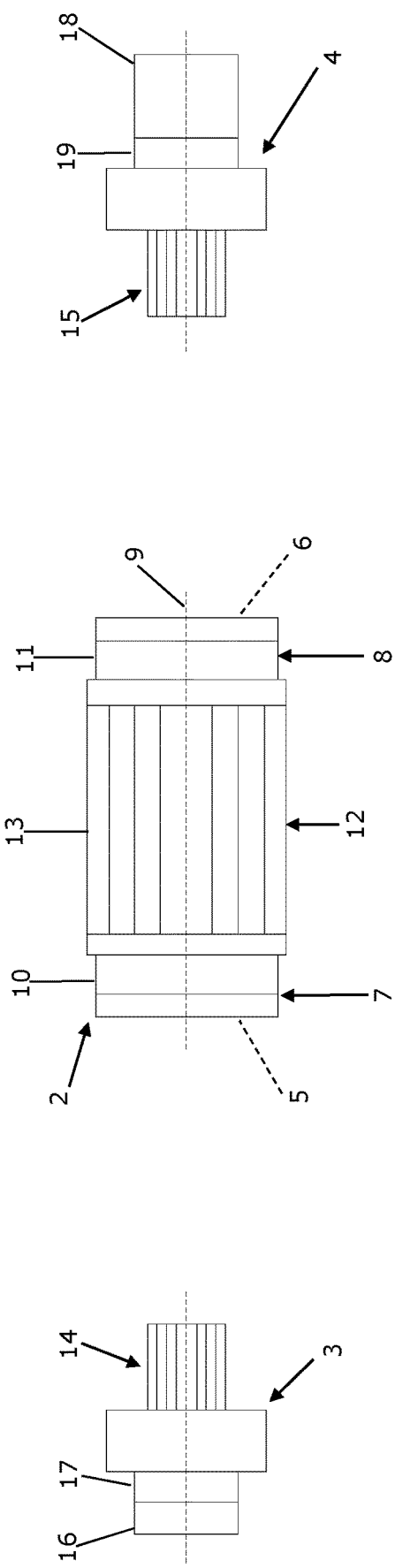
Fig. 1
Fig. 2

METHOD FOR PRODUCING A MOTOR SHAFT OF A ROTOR OF AN ELECTRIC MOTOR

CROSS REFERENCE TO RELATED APPLICATIONS

Applicant claims priority under 35 U.S.C. § 119 of European Application No. 16195668.5 filed on Oct. 26, 2016, the disclosure of which is incorporated by reference.

BACKGROUND OF THE INVENTION

The invention relates to a method for producing a motor shaft of an electric motor, in which method a first module of the motor shaft and an additional module of the motor shaft are produced and interconnected,
the first module of the motor shaft being produced by a base module of the first module being provided with a module-end connection element on an end assigned to the additional module of the motor shaft,
the additional module of the motor shaft being produced by a base module of the additional module being provided with a module-end connection element on an end assigned to the first module of the motor shaft, and
the first module of the motor shaft and the additional module of the motor shaft being interconnected by joining the module-end connection elements on both ends.

The invention further relates to a set of modules for producing a motor shaft of an electric motor according to the above method, and to a motor shaft of an electric motor produced according to the above method.

Conventional electric motors consist of a stator and a rotor, which in turn comprises a motor shaft. Due to the forces that the stator and rotor magnetic fields exert on one another, the rotor, including the motor shaft, is set in rotary motion. The rotary motor shaft can be connected to a machine directly or via a transmission. For this purpose, the motor shaft is provided with a coupling on at least one shaft end. In addition, the motor shaft is often used to determine the motor speed using corresponding measuring devices and/or to reduce the motor speed by a brake device acting on the motor shaft.

A generic electric motor is disclosed in DE 203 07 198 U1. This document relates to a modular motor shaft of an electric motor, in the case of which a central shaft portion is connected to a first and second outer shaft portion by a press-fit assembly. The central shaft portion comprises a hole at both axial ends, which hole receives an end of one of the outer shaft portions and the inside diameter of which is adapted to the outside diameter of the respective outer shaft portion.

SUMMARY OF THE INVENTION

The problem addressed by the present invention is that of optimizing the manufacturing process of the prior art.

This problem is solved according to the invention by a motor shaft in which a module-end connection element is provided on a first module and/or on an additional module of a motor shaft of an electric motor by cold forming and/or by warm forming and/or by hot forming a base module which is usually present as a semi-finished product and consists of a metal material which is conventional for motor shafts. Cold forming gives the possibility of producing the connection elements on the shaft module or modules in a highly precise manner and with relatively low manufacturing effort. Remachining the connection elements following the forming process can usually be dispensed with. Warm forming and hot forming are characterised for example by the high degree of forming that can be achieved. According to the invention, the module-end connection elements are, for example, toothed regions or polygonal structures on the shaft modules. These types of module-end connection elements are particularly suitable for being manufactured by means of cold forming.

The first module and the additional module of the motor shaft are interconnected by joining the module-end connection element of the first shaft module and the module-end connection element of the additional shaft module. By connecting the first module and the additional module the entire body of the motor shaft can be produced. However, it is also conceivable that the first module and the additional module together only form part of the motor shaft.

The set of modules according to the invention comprises at least one module, which is provided as the first module, and at least two additional modules. The additional modules are different in terms of their characteristics. For example, the additional modules may consist of different materials, may have different geometries or dimensions and/or may have different functional features. Common to the additional modules is their compatibility with the first shaft module to the effect that each of the additional modules has a module-end connection element which is suitable for producing a connection between the first module and the additional module of the motor shaft, in cooperation with the module-end connection element of the first module. In order to produce a motor shaft, the first module can optionally be combined with one of the additional modules. In this manner, a motor shaft can be configured such that it is optimally adapted for the particular use. Insofar as various uses permit, the same first module can be used for all uses and the motor shaft can be structurally adapted to the specific use exclusively by means of the additional module.

In a preferred embodiment of the invention, axial forming and/or rotary swaging is preferred for cold forming the first module of the motor shaft and/or the additional module of the motor shaft. During axial forming, the base module of the respective shaft module and a die are moved relative to one another in the axial direction of the base module. In the process, the geometry of the die is reproduced on the base module of the shaft module and thus produces the module-end connection element. When using a corresponding die, a toothing can be produced as the module-end connection element. During rotary swaging, the base module of a shaft module to be machined is acted upon in the radial direction by forming tools in a forging-like manner. By means of rotary swaging, for example a shaft module end having a polygonal cross section can be produced on a base module of a shaft module as the module-end connection element.

In another preferred embodiment of the invention, only one of the modules from the first and the additional module of the motor shaft is provided with the module-end connection element by cold forming and/or by warm forming and/or by hot forming a base module, while the base module of the other shaft module is machined by cutting in order to manufacture the module-end connection element. In this case, separation methods of various kinds, in particular material-removing separation methods, are conceivable.

In another embodiment of the invention, the base module of the first module and/or the base module of the additional module of the motor shaft is provided not only with a module-end connection element but also with additional functional features during the production of the module.

In a preferred embodiment of the invention, a bearing seat for rotatably mounting the respective shaft module or the entire motor shaft is provided on the base module in question.

According to the invention, the production of the additional functional feature or features, in this case of the bearing seat for rotatably mounting the shaft module or the motor shaft, can follow the production of the module-end connection element. However, providing the additional functional feature or features before or at the same time as the production of the module-end connection element on the base module of the respective shaft module is alternatively conceivable.

In addition or as an alternative to a bearing seat for rotatably mounting the respective shaft module or the motor shaft, a coupling element can be provided on the base module of the shaft module in question. The coupling element can be used, for example, to connect the motor shaft to a machine directly or to the transmission of a machine.

In one embodiment, the motor shaft of an electric motor is composed of shaft modules of which one is assigned to the anchor of the electric motor in question as an anchor module and of which another is used as a coupling module in order to couple the motor shaft to a machine, for example. In another embodiment of the invention, the anchor module of the motor shaft is provided not only with a module-end connection element but also with a seat for the anchor of the electric motor. Preferably, in the case of the invention, the seat for the anchor of the electric motor is also manufactured by cold forming, in particular axial forming or rotary swaging the base module of the respective shaft module.

In another embodiment of the invention, the first module of the motor shaft and the additional module of the motor shaft can be interconnected by joining using forming. By means of joining using forming, a connection can be produced between the shaft modules, which is in particular also capable of bearing loads in the axial direction of the motor shaft. Additionally or alternatively, in order to connect the shaft modules, joining methods which result in an interlocking and/or integral connection between the shaft modules are possible, it being possible for the integral connection to be in the form of an adhesive connection, for example. Hybrid connections, for example connections where an interlocking connection and a frictional connection or an interlocking connection and an integral connection are combined, are generally conceivable. In particular, an interlocking connection between the shaft modules acting in the direction of rotation of the motor shaft is advantageous.

BRIEF DESCRIPTION OF THE DRAWINGS

The invention will be described in more detail in the following with reference to schematic drawings given by way of example, in which:

FIG. 1 shows a modular motor shaft of an electric motor,

FIG. 2 shows the shaft modules of which the motor shaft according to FIG. 1 consists.

DETAILED DESCRIPTION OF THE EMBODIMENTS

Figure 3:
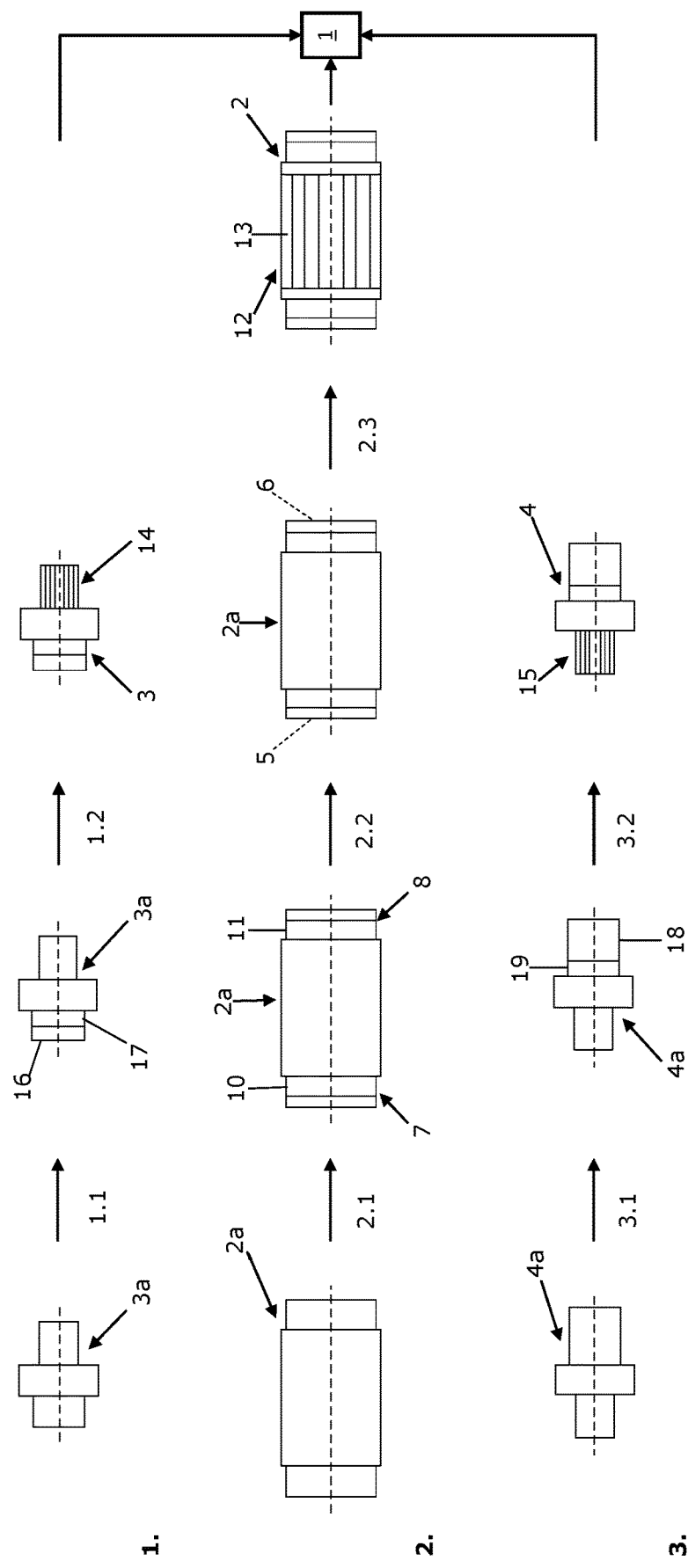
FIG. 3 shows some representations for illustrating the method for producing the motor shaft according to FIG. 1.

According to FIGS. 1 and 2, a modular motor shaft 1 of an electric motor consists of a first module provided as an anchor module 2 and additional modules which, in the embodiment shown, are coupling modules 3, 4.

The anchor module 2 is provided with a first module-end connection element 5 on the end assigned to the coupling module 3 and a second module-end connection element 6 on the end assigned to the coupling module 4. The first module-end connection element 5 of the anchor module 2 is formed as a toothing which is formed in the inner wall of a hollow cylindrical longitudinal portion 7 of the anchor module 2. Correspondingly, a toothing formed in the inner wall of a hollow cylindrical longitudinal portion 8 of the anchor module 2 is provided as the second module-end connection element 6 of the anchor module 2. The two toothings cannot be seen in FIGS. 1 to 3 and consist of teeth which extend in parallel with a shaft axis 9 of the motor shaft 1.

A bearing seat 10 for a roller bearing (not shown) for rotatably mounting the motor shaft 1 is located on the outside of the hollow cylindrical longitudinal portion 7 of the anchor module 2. Correspondingly, the hollow cylindrical longitudinal portion 8 of the anchor module 2 is provided with a bearing seat 11 for a roller bearing for rotatably mounting the motor shaft 1. A seat 13 for an anchor (likewise not shown) of the electric motor, more specifically for a laminated core of the anchor, is formed on a central part 12 of the anchor module 2 arranged between the hollow cylindrical longitudinal portions 7, 8.

On the end assigned to the anchor module 2, the coupling module 3 comprises a module end provided with an external toothing as the module-end connection element 14, which module end is structurally identical to a module-end connection element 15 of the coupling module 4.

The external toothings on the coupling modules 3, 4 are adapted, with respect to their geometry, to the internal toothings provided as module-end connection elements 5, 6 of the anchor module 2. The external toothings on the coupling modules 3, 4 and the internal toothings on the anchor module 2 can consequently be brought into mutual engagement, the intermeshing external and internal toothings being supported against one another about the shaft axis 9 with zero clearance.

On the end remote from the module-end connection element 14, the coupling module 3 is provided with a coupling element 16 which is formed in the embodiment shown as a module end that has a polygonal cross section.

A seat 17 for the shaft-end part of a rotary encoder for measuring the speed of the motor shaft 1 directly adjoins the coupling element 16 in the axial direction of the coupling module 3.

The coupling module 4 comprises a coupling element 18 on the end remote from the module-end connection element 15, which coupling element corresponds to the coupling element 16 on the coupling module 3 insofar as the coupling element 18 also forms a module end that is polygonal in cross section. The coupling element 16 of the coupling module 3 and the coupling element 18 of the coupling module 4 differ from one another in terms of structure insofar as the coupling element 18 has a greater axial length than the coupling element 16. A seat 19 on the coupling module 4 for a shaft-end part of the rotary encoder for measuring the speed of the motor shaft 1 is immediately adjacent to the coupling element 18 in the axial direction.

FIG. 3 illustrates the sequence of the method for producing the motor shaft 1, the method steps at 1. relating to the coupling module 3, the method steps at 2. relating to the anchor module 2, and the method steps at 3. relating to the coupling module 4.

The representations for illustrating the production of the coupling module 3 start with the view of a base module 3a that is present as a semi-finished product. In the embodiment shown, the base module 3a has been manufactured from a steel blank by a material-removing separation. Alternatively, it would also have been possible, inter alia, to produce the base module 3a by forming, for example by hot forming or by rotary swaging from a corresponding blank.

In method step 1.1, the base module 3a is provided with the seat 17 for the shaft-side part of the rotary encoder by cutting. Moreover, in the region immediately adjacent to the seat 17, the base module 3a is formed into the coupling element 16.

In method step 1.2, on the end of the base module 3a remote from the coupling element 16 and the seat 17, the external toothing provided as the module-end connection element 14 is produced by cutting. The production of the coupling module 3 is thus completed.

Correspondingly, a base module 4a for the coupling module 4 is likewise manufactured from a steel blank and the coupling module 4 is produced from the base module 4a by making the seat 19 for the shaft-side part of the rotary encoder, the coupling element 18 and the module-end connection element 15.

The starting point for manufacturing the anchor module 2 is a steel base module 2a, which has been made as a semi-finished product by cutting or forming machining of a blank.

In method step 2.1, the bearing seats 10, 11 are produced on the ends of the base module 2a by cutting and subsequently the hollow cylindrical longitudinal portions 7, 8 are likewise made by cutting machining the base module 2a. In method step 2.2, the axis-parallel inner walls of the hollow cylindrical longitudinal portions 7, 8 are then provided, in the embodiment shown, with the internal toothings provided as the module-end connection elements 5, 6 by cold forming, more specifically by axial forming.

In method step 2.3, the production of the seat 13 for the anchor of the electric motor follows the production of the module-end connection elements 5, 6. For this purpose, connecting elements are produced by cold forming on the central part 12 of the anchor module 2 thus completed, by way of which connecting elements the laminated core of the anchor can be fixed in position on the central part 12 of the anchor module 2.

Finally, the motor shaft 1 is assembled from the anchor module 2 and the coupling modules 3, 4 by a joining process (indicated by arrows in FIG. 3). For this purpose, the module-end connection element or the external toothing 14 on the coupling module 3 is pushed into the hollow cylindrical longitudinal portion 7 on the anchor module 2 and the module-end connection element or the external toothing 15 on the coupling module 4 is pushed into the hollow cylindrical longitudinal portion 8 of the anchor module 2. When the connection elements 5, 14; 6, 15 on both ends are in mutual engagement, by exerting a radially inwardly directed force on the outside of the hollow cylindrical longitudinal portions 7, 8 and by associated forming of the hollow cylindrical longitudinal portions 7, 8, a frictional connection is additionally produced between the module-end connection elements 5, 14; 6, 15 on both ends.

The intermeshing toothings of the module-end connection elements 5, 14; 6, 15 produce an interlocking connection between the anchor module 2 and the coupling modules 3, 4, owing to which interlocking connection the motor shaft 1 is able to transfer forces in the direction of rotation about the shaft axis 9. The anchor module 2 and the coupling modules 3 and 4 are secured to one another in the axial direction of the motor shaft 1 by the frictional connection between the module-end connection elements 5, 14: 6, 15 acting in the axial direction.

If required, the above method steps for the production of the motor shaft 1 may be followed by additional method steps. In particular a cutting and/or forming process is conceivable for limiting manufacturing tolerances occurring at the motor shaft 1 to a permissible level, which process follows the joining of the module-end connection elements 5, 14; 6, 15.

Since the coupling module 3 can be connected, by the module-end connection element 14, to the anchor module not only at the module-end connection element 5 of the anchor module 2 but also at the module-end connection element 6 of the anchor module 2, and since a connection is also possible between the coupling module 4 and the anchor module 2 not only at the module-end connection element 6 but also at the module-end connection element 5 of the anchor module 2, the anchor module 2 and the coupling modules 3, 4 provided as the additional modules form a set of modules of which the modules can be combined in different manners to form a motor shaft and which accordingly gives the possibility of configuring motor shafts for various uses.

What is claimed is:

1. A method for producing a motor shaft of a rotor of an electric motor, comprising the following steps:
   producing a first module of the motor shaft and an additional module of the motor shaft; and
   interconnecting the first module and the additional module,
      wherein the first module of the motor shaft is produced by providing an inner wall of a hollow cylindrical longitudinal portion of a base module of the first module with an inner toothing as a module-end connection element on an end assigned to the additional module of the motor shaft,
      wherein the additional module of the motor shaft is produced by providing a base module of the additional module with an external toothing as a module-end connection element on an end assigned to the first module of the motor shaft,
      wherein the internal toothing and the external toothing of the base modules of the first and additional modules are configured to be brought into mutual engagement and, thereby, to mutually support the first and the additional modules of the motor shaft about a shaft axis of the motor shaft,
      wherein one of the first module of the motor shaft and the additional module of the motor shaft is provided with the module-end connection element by cold forming in the form of axial forming the respective base module,
      wherein the other one of the first module of the motor shaft and the additional module of the motor shaft is provided with the module-end connection element by cutting the respective base module, and
      wherein the first module of the motor shaft and the additional module of the motor shaft are interconnected by joining the module-end connection elements on both ends.

2. The method according to claim 1, wherein at least one of the first module of the motor shaft and the additional module of the motor shaft is produced by providing the respective base module with a bearing seat for rotatably mounting the motor shaft.

3. The method according to claim 2, wherein the at least one of the first module of the motor shaft and the additional module of the motor shaft is produced by providing the respective base module first with the bearing seat for rotatably mounting the motor shaft and then with the module-end connection element.

4. The method according to claim 1, wherein at least one of the first module of the motor shaft and the additional module of the motor shaft is produced by providing the respective base module with a coupling element on an end remote from the module-end connection element.

5. The method according to claim 1, wherein one of the first module of the motor shaft and the additional module of the motor shaft is produced as an anchor module and the other one of the first module of the motor shaft and the additional module of the motor shaft is produced as a coupling module.

6. The method according to claim 5, wherein the anchor module of the motor shaft is produced by providing the respective base module with a seat for an anchor of the electric motor.

7. The method according to claim 1, wherein the first module of the motor shaft and the additional module of the motor shaft are interconnected by joining the module-end connection elements on both ends by one of the following methods: forming, interlockingly joining and substance-to-substance joining.

* * * * *